UNITED STATES PATENT OFFICE.

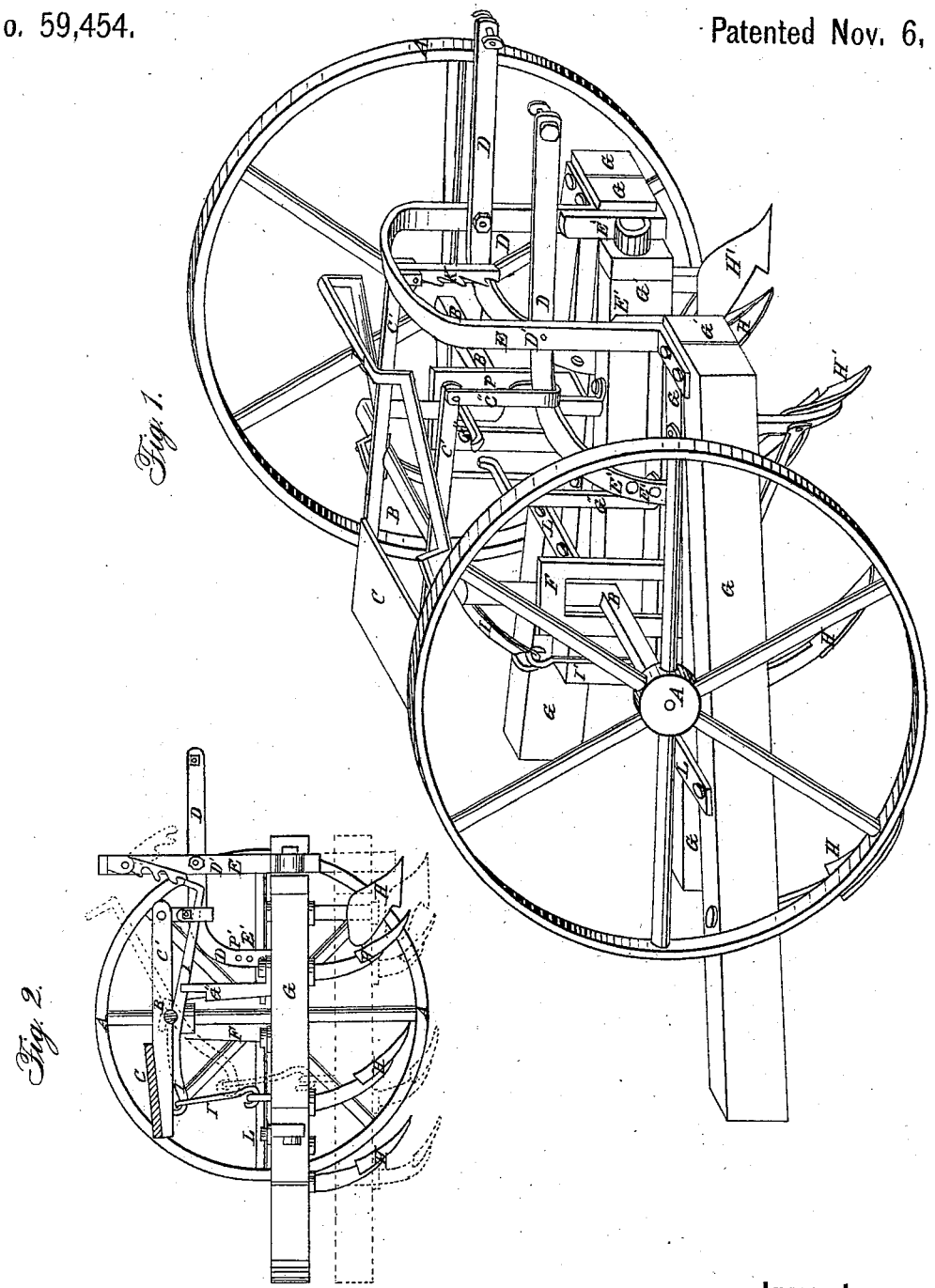

C. S. ROBERTS, OF LYONS, IOWA.

IMPROVEMENT IN CULTIVATORS.

Specification forming part of Letters Patent No. 59,454, dated November 6, 1866.

*To all whom it may concern:*

Be it known that I, C. S. ROBERTS, of Lyons, in the county of Clinton and State of Iowa, have invented a new and useful Improvement in Cultivators; and I do hereby declare that the following is a full, clear, and exact description of the same, reference being had to the annexed drawings, in which—

Figure 1 is a perspective view, and Fig. 2 is a section.

The same letters are employed in both figures in indicating the same parts.

The cultivator is carried upon wheels A A, revolving upon the bent axle B, which supports the driver's seat C upon bars C', which are carried forward of the axle, and by the stirrups C'', attached to the braces D D, to which the tongue is attached in front. These braces have holes E', through which bolts passing into the drag-bars adjustably secure them. The braces turn upon bolts D', by which they are attached to the arch E.

The drag-bars and plows are suspended below the axle. The yokes F are attached to the drag-bars on each side, and have on their inner faces eyes F', in which they slide up and down on the perpendicular parts of the axle B. G G and G' are the drag-bars. The drag-bars G G are fixed by the feet of the arch E, and by the braces L across the rear end. The drag-bars G' are formed with journals on the ends, permitting their lateral oscillation within the boxes E' in front, and like boxes on the end of the braces L. The levers G'' are attached to the oscillating drag-bars G', and, extending upward, are bent inward, so that the driver can, by his feet, regulate the position of the inner plows.

The drag-bars carry the shovel-plows H H H, one on each, so arranged as to turn the earth over the entire space between the rows of corn. These shovel-plows I construct with two curved faces uniting to form an angle along their middle line on their front faces. H' H' are mold-boards, attached to the front of the middle drag-bar, so that when cultivating large corn the earth may be thrown from each side against the row of corn. In cultivating small corn shovel-plows are used instead of the mold-board plows. The shovel-plows carried by the oscillating drag-bars are set immediately in rear, but on the inner side, of the mold-board plows H'.

The lever I is made in one piece, extending across in front of the driver, and then carried back and attached so as to turn on the axle, to which it is attached by boxes. The rear end of this lever behind the axle is attached to the rods I by eyes allowing the free action of the lever, and these rods are in like manner attached to the fixed drag-bars. By raising and lowering this lever the entire frame-work with the plows is raised or lowered as desired. The notched bar K, attached to the top of the arch, will retain the lever when it is so depressed as to raise the plows out of the ground.

What I claim as my invention, and desire to secure by Letters Patent, is—

1. The drag-bars G and G', arch E, and brace L, when respectively constructed and arranged for use substantially as set forth.

2. The combination of the drag-bars G, stirrups F, axle B, lever I, and rods I', substantially as and for the purpose set forth.

3. The curved braces D, when adjustably attached to the frame-work of a cultivator, substantially in the manner and for the purpose set forth.

4. The combination of the shovel-plow, H and mold-board plows H', when the inner shovel-plows are made adjustable, and arranged substantially as set forth.

In testimony whereof I have signed my name to this specification in the presence of two subscribing witnesses.

C. S. ROBERTS.

Witnesses:
  W. W. SANBORN,
  G. W. HAMMOND.